United States Patent
Martinez et al.

(10) Patent No.: US 9,116,959 B2
(45) Date of Patent: *Aug. 25, 2015

(54) SHARING A SINGLE INSTANCE OF A USER DEFINED TYPE

(75) Inventors: Andrea C. Martinez, Poughkeepsie, NY (US); Charles Matula, Poughkeepsie, NY (US); David H. Starke, Poughkeepsie, NY (US); Gregory R. Wiley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 84 days.

This patent is subject to a terminal disclaimer.

(21) Appl. No.: 12/768,112

(22) Filed: Apr. 27, 2010

(65) Prior Publication Data
US 2010/0211598 A1 Aug. 19, 2010

Related U.S. Application Data

(63) Continuation of application No. 11/691,719, filed on Mar. 27, 2007, now Pat. No. 7,779,037.

(51) Int. Cl.
*G06F 7/00* (2006.01)
*G06F 17/30* (2006.01)
*G06F 17/00* (2006.01)

(52) U.S. Cl.
CPC .... *G06F 17/30483* (2013.01); *G06F 17/30342* (2013.01); *G06F 17/30607* (2013.01); *Y10S 707/955* (2013.01)

(58) Field of Classification Search
CPC ................... G06F 17/30483; G06F 17/30607; G06F 17/30342
USPC ........... 707/803, 999.001–999.005, 791, 796, 707/955
See application file for complete search history.

(56) References Cited

U.S. PATENT DOCUMENTS

| | | | | |
|---|---|---|---|---|
| 4,829,427 | A * | 5/1989 | Green | 1/1 |
| 5,555,388 | A * | 9/1996 | Shaughnessy | 711/100 |
| 6,016,497 | A | 1/2000 | Suver | |
| 6,708,186 | B1 | 3/2004 | Clabom et al. | |
| 6,789,074 | B1 * | 9/2004 | Hara et al. | 1/1 |
| 6,941,316 | B2 | 9/2005 | Venkatesh et al. | |
| 7,284,010 | B2 * | 10/2007 | Rajan et al. | 1/1 |
| 2002/0156772 | A1 * | 10/2002 | Chau et al. | 707/3 |
| 2002/0174138 | A1 * | 11/2002 | Nakamura et al. | 707/200 |
| 2003/0212660 | A1 * | 11/2003 | Kerwin | 707/1 |
| 2005/0091255 | A1 * | 4/2005 | Rajan et al. | 707/102 |
| 2005/0177551 | A1 | 8/2005 | Rathakrishnan et al. | |
| 2005/0289160 | A1 | 12/2005 | Ashwin et al. | |
| 2008/0319939 | A1 * | 12/2008 | Tarin | 707/1 |

* cited by examiner

*Primary Examiner* — Kannan Shanmugasundaram
(74) *Attorney, Agent, or Firm* — DeLio, Peterson & Curcio, LLC; Kelly M. Nowak; Ronald Kaschak

(57) ABSTRACT

Methods, systems and apparatus for implementing behavior of a user defined type (UDT) in a database by providing a data table with multiple rows and generating a UDT table having only a single row. An instance of a UDT is created and stored in the single row of the UDT table. A query having a Cartesian product is implemented to join the UDT table and data table for invoking behavior of the UDT and generating a resultant data table without increasing cardinality thereof. The single instance of the UDT may be shared amongst several users of the database as a result of all required persisted objects of the UDT residing within only a single row of the UDT table.

20 Claims, 4 Drawing Sheets

|  | UDT 1 | UDT 2 | UDT 3 |
|---|---|---|---|
| R1 | A B C | 1 2 3 | RED |
| R2 | D C | 4 5 | BLUE GREEN |
| R3 | A |  | BLUE |
| R4 | E B |  |  |

FIG. 1
PRIOR ART

SHARING A SINGLE INSTANCE OF A USER DEFINED TYPE

BACKGROUND OF THE INVENTION

1. Field of the Invention

This invention relates generally to data processing, and more particularly, to storing and accessing an instance of a user defined type in a table for optimization of a relational database management system.

2. Description of Related Art

A Relational Database Management System (RDBMS) is a database management system that uses relational techniques for storing and retrieving data. Relational databases are organized into physical tables that consist of rows and columns of data, wherein the data is defined so that it can be reorganized and accessed in a number of different ways. A requesting entity, which may be an application or the operating system, requests database access using a high-level query language.

Simple algebraic operations, such as those embodied in Structured Query Language (SQL), are used to process large amounts of data within a relational database. SQL is a programming language for getting information from, writing information to and updating a database by allowing users to formulate relational operations through queries or requests on tables or views. These table queries may be interactive, in batch files, or embedded in host languages, and may be used to logically link information from multiple tables or views to perform complex sets of procedures. In order to perform such operations, SQL operators are provided that operate on one or two tables and produce a new table as a result.

While relational databases are useful for storing and processing large amounts of data, as the data types become increasingly complex, more focused database models are required for storing and processing such complex data. For instance, object-oriented databases are able to integrate computer code with a variety of different types of data, including, complex and hierarchical data. In such a system, the data values in a column may be objects which have user defined types, which are complex data types that include both state information and methods for using such state information. However, since the ability to access data within an object-oriented database is often cumbersome and difficult, these types of databases are often undesirable and have hindered the development of easy SQL-type access mechanisms.

More recently, object-relational databases have been developed to include the advantages of both the relational and object-oriented databases. Object-relational databases provide the flexibility of storing complex and hierarchical data, along with the ability to access such data through database methodologies, such as those used in relational database modeling (e.g., SQL queries). However, current access to this complex data requires iteration through data tables having columns each with a number of rows. This requires the user of the database to construct an algorithm, or even a number of algorithms, to access such data, which in turn, is time consuming and leads to loss in productivity. Further, since the user defined data may be accessed from different rows, which may or may not reside in different tables, any inaccuracies in the algorithm may undesirably result in the exclusion of or dropping of required user defined data that another data type directly or indirectly makes use of, thereby resulting in an error.

Therefore, there continues to be a need in the art for improved methods, systems and articles for storing and accessing embedded data in a database management system.

SUMMARY OF THE INVENTION

Bearing in mind the problems and deficiencies of the prior art, it is therefore an object of the present invention to provide methods, systems and articles for easily and efficiently storing and accessing embedded data in a database management system.

Another object of the present invention is to provide an efficient query system for accessing embedded data, particularly, embedded user defined data, in a database system.

It is another object of the present invention to provide methods, systems and articles for easily and efficiently storing and accessing embedded user defined data in a relational database for sharing a single instance of such user defined data.

Still other objects and advantages of the invention will in part be obvious and will in part be apparent from the specification.

The above and other objects, which will be apparent to those skilled in the art, are achieved in the present invention, which is directed to a method of implementing behavior of a user defined type in a database management system. The method includes providing a database having a data table with multiple rows and generating within the database a user defined type (UDT) table having only a single row. An instance of a UDT having persisted objects is created and stored within the single row of the UDT table. A query having a Cartesian product is then implemented to join the UDT table and data table for invoking behavior of the instance of the UDT. The result is a resultant data table having an equivalent cardinality as the data table.

The UDT may be a distinct UDT, a structured UDT or a reference UDT. The database may be either a relational database or an object relational database. Optionally the UDT table may include multiple columns defined as various UDTs, whereby every instance of the various UDTs each has only a single row for storing their respective persisted objects therein. From this single row, at least one or more of the persisted objects are used by the query to invoke the behavior of the UDT. These persisted objects may be data objects, methodology or even combinations thereof.

In accordance with the invention, only a single instance of the present UDT resides on the database. As such, the database may have multiple data tables, each with multiple rows, whereby upon implementing the query to join the UDT table and each of these multiple data tables, behavior of the UDT is invoked to generate multiple resultant data tables. An essential feature of the invention is that each of these multiple resultant data tables has the same number of data rows (cardinality) as compared to the number of rows in its corresponding data table with which the UDT table was joined.

In this aspect, either a single user or multiple users of the database may use the present single instance of the UDT table. The single user, or multiple users sharing the UDT table, may generate additional queries for implementation on the single instance of the UDT table of the invention. These queries may be simultaneously or sequentially executed. The methods of the invention are particularly useful for higher order languages such as, for instance, SQL.

The invention is also directed to systems, articles and products for performing the present methods of implementing behavior of a user defined type in a database management system.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is a prior art illustration of a conventional user defined type database table.

DESCRIPTION OF THE PREFERRED EMBODIMENT(S)

Figure 2:
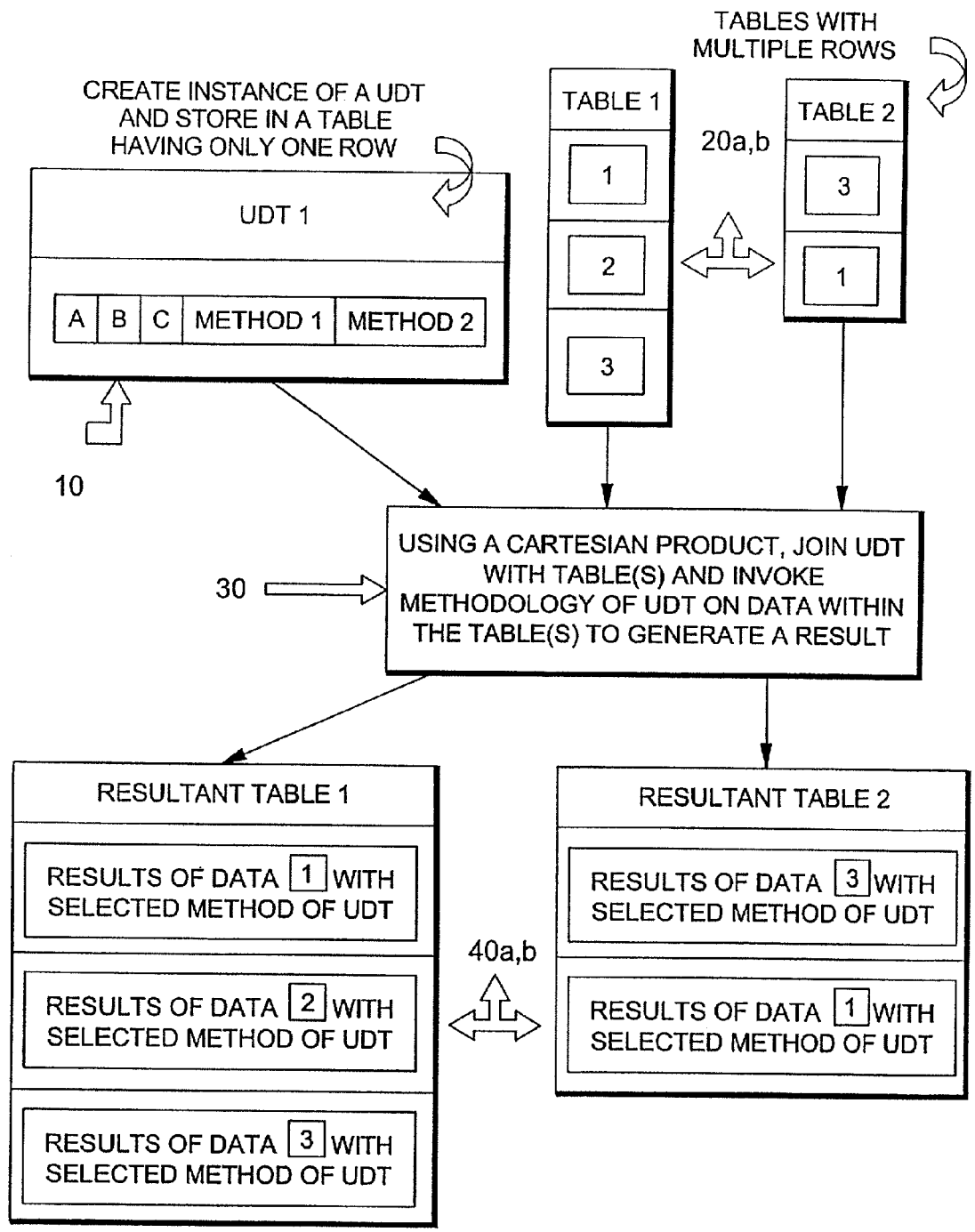
FIG. 2 is a flowchart illustrating one embodiment of an aspect of a method of the present invention.

In describing the preferred embodiment of the present invention, reference will be made herein to FIGS. 1-4 of the drawings in which like numerals refer to like features of the invention.

A user defined type (UDT) is a data type created by a user and stored in a database. Generally, user defined data types contain state information and methods for invoking such state information. As such, it is often desired, or even required, that a user of the database access and use this type of data multiple times for a given method, and/or even share such data type amongst several users or entities of the database.

There are three user defined data types, namely, a distinct type, a structured type and a reference type. A distinct type is a UDT that shares its internal representation with an existing type (its "source" type), but is considered to be a separate and incompatible type for most operations. For example, one might want to define a picture type, a text type, and an audio type, all of which have quite different semantics, but which use the same built-in data type for their internal representation. This allows the creation of functions written specifically for each type (e.g., a picture), and assures that these functions will not be applied to values of any other data type (e.g., text and audio).

A structured type is a UDT having a structure defined in the database and contains one or more named attributes, each of which has a name and a data type of its own. A structured type can be a subtype of another structured type (called a supertype), defining a type hierarchy. Each structured type may be a type of table (i.e., typed table), view (i.e., typed view), or column. Generally, within typed tables and typed views, each column within such tables and views derives its name and data type from one of the attributes of the structured type. Rows of the typed table or typed view represent instances of the structured type. A structured user defined data type also includes a set of methodologies, whereby such methods are used to retrieve and/or manipulate attributes of a structured column object. A type cannot be dropped if certain other objects use the type, either directly or indirectly. For example, a type cannot be dropped if a table or view column makes direct or indirect use of the type.

Reference user defined type is a companion to a structured type. Like that of the distinct type, a reference type shares a common representation with one of the built-in data types, which is shared for all types in the type hierarchy. The reference type representation is defined when the root of a type hierarchy is created, and when using the reference type, a structured type is specified as the parameter.

Traditionally, regardless of the type of user defined data, this data type is created and stored in a table or view having columns with multiple rows. FIG. 1 shows an example of a traditional relational database table with columns of UDTs each with multiple rows, whereby data objects, and optionally methodology, reside in the rows of each corresponding UDT. In order to access data objects and methods within a given row, a query (i.e., a process or algorithm) that makes a specific reference to the exact row having the desired data is used for access thereof and invoking of any such methods therein.

However, a problem with the conventional UDTs is that often a number of queries must be generated when the desired data resides in a number of different rows within a UDT table (e.g., a separate query for each row). Also, in order to minimize cardinality (i.e., number of rows) of the resultant data set, a number of separate UDT tables are often required for joining against the various rows of the database table. As such, these conventional UDT approaches are cumbersome and time consuming, and may even provide inaccurate results since all required data may not reside within a selected row of the UDT and/or due to faulty queries (e.g., exclusion or dropping of required user defined data), which leads to loss of productivity.

The present invention overcomes these problems of the prior art by providing improved methods and systems for storing and retrieving user defined data types in relational database or object relational database systems. The methods and systems of the invention easily and efficiently store user defined data types in a relational table of the invention, which has only a single row. The invention also provides efficient access to this stored user defined data so that a single instance of such user defined data can be employed in a number of different queries by a user, or even shared amongst various users of the database, at their respective computers, for use in a number of different queries.

FIG. 2 shows an instance of a UDT of the invention defined on a database server. However, it should be appreciated that many variations of the present single-rowed UDT table will exist in accordance with the invention, whereby such UDT variations can be any of the above-described types. In so doing, a relational table is generated in a database management system, whereby this relational table 10 has at least one column of a UDT with only a single row. Alternatively, the present UDT relational table 10 may be generated such that it contains multiple columns of UDTs, each with only a single row (i.e., one row) of persisted objects.

The persisted objects in the single row of the present UDT table include data objects, methods and combinations thereof for invoking behavior of the instance of the UDT. The UDT behavior is implemented by using at least some, if not all, of the data objects within the single-Towed UDT table. For instance, referring to FIG. 2, the UDT table 10 may have a number of data objects (e.g., data objects A, B, C, D, etc.) as well as a number of different methods (i.e., method 1, method 2, etc.) that implement selected data objects, or even possibly all of the data objects, within the single row UDT table. As such, all necessary data objects and methods needed for implementing methodology (i.e., behavior) of a persisted object in the UDT table are stored in the present single row UDT table, which essentially eliminates any exclusions or dropping of required user defined data that the methodology or other data types directly or indirectly use or rely upon.

Once the UDT table 10 of the invention is generated and stored in the database, the methodologies therein may be invoked against various other data tables within the relational database. For illustration purposes, and not to limit the invention, FIG. 2 shows two data tables 20a, 20b that reside in the database. These tables 20a, 20b may be separate tables having a number of columns (i.e., Table 1 column and Table 2 column) each with numerous rows of data, or it may be a single table having both numerous columns and numerous rows.

In order to invoke methodology or generate behavior of the present single-rowed UDT table, a query 30 is generated to join the UDT table 10 with at least one column, possibly multiple columns, of a separate database table (e.g., table 20a and/or table 20b, etc.). An essential feature is that the query 30 of the invention includes a Cartesian product for joining the UDT table to another table within the database.

As will be understood, a Cartesian product is a direct product of all possible sets of ordered pairs of data from at least two data sets (e.g., Cartesian product of two sets X and Y is denoted as X×Y={(x,y)|x∈X and y∈Y}. For example, if table X has three data rows, respectively containing data objects 1, 2 and 3, and table Y has two data rows, respectively containing data objects a and b, when tables X and Y are joined using a Cartesian product the cardinality (i.e., number of rows) of the resultant data table is significantly increased to six rows containing, respectively, data objects 1a, 1b, 2a, 2b, 3a and 3c. However, in the art of the invention, joined tables each have numerous rows, or even complex data therein, such that the cardinality of the resultant data table is deleteriously large when numerous rows are joined against numerous rows. As such, while Cartesian Products may be known in the art, they are disfavored, particularly in higher order languages (e.g., SQL), and generally result from a faulty query since all combinations of rows of joined tables will be displayed, which is undesirably time consuming, memory intensive and leads to loss of productivity.

Advantageously, it has now been found that by generating a UDT table with only a single row, and storing both data objects and methodology (i.e., behavior) in this single row, behavior is obtainable from the UDT without increasing cardinality of the resultant data set using a Cartesian product. Another advantage is that because of the use of the present Cartesian product query, the single-rowed UDT table of the invention need only be generated once, as compared to conventional UDT tables with a number of rows having to be generated numerous times for joining with data rows in order to avoid increasing cardinality of the resultant data set.

In accordance with the invention, a query 30 with a Cartesian product is generated such that it joins the UDT table 10 with one or more data tables 20a, 20b of the relational database for invoking desired (or selected) methodology of the UDT table 10 on the data residing within such data tables 20a, 20b. The desired method(s) of the UDT table 10 are invoked, whereby selected ones, or all, of the data objects within the UDT table 10 are used in the selected UDT method(s) along with data from data tables 20a, 20b having rows (1 ... n). The present query 30 includes a Cartesian product, such that, when the single row UDT table 10 containing data and methodology is joined with the rows (1 ... n) of relational database tables 20a, 20b, the cardinality (i.e., number of rows) of the resultant tables 40a, 40b are not increased over that of the number of rows of joined relational database tables 20a, 20b, as is shown in FIG. 2. Further, since all necessary persisted objects are contained within the single row of the present UDT table 10, a single instance of UDT table 10 can be used for every row of every joined database table, thereby avoiding the need for separate instances of a UDT table for joined rows.

For example, the below query 30 (i.e., algorithm) or other equivalent may be used to join relational database tables with the preset single row UDT table 10 to generate useful resultant data tables without increasing the cardinality thereof. The UDT table 10 is a single row UDT in SQL (i.e., SQL_SINGLETON(SINGLETON)) having an instance of a UDT named CHANGE_INDICATOR with persisted objects of methods named INIT and GET_INDICATOR. This UDT table is to be joined to a first relational database table 20a named TABLE_ONE and a second database table 20b named TABLE_TWO. Using a SELECT . . . FROM clause, data from database table 20a and methods of the CHANGE_INDICATOR UDT (as well as any other persisted objects within the UDT table that such methods rely upon) are selected, with the FROM clause identifying such database table 20a (i.e., TABLE_ONE) and UDT table (i.e., SQL_SINGLETON). The subset of data is treated as a new table, which is typically a temporary table, called TEMP_TABLE_ONE. Likewise, for the second database table 20b named TABLE_TWO, this process is repeated to generate a temporary table called TEMP_TABLE_TWO.

The query 30 then uses a Cartesian product to SELECT all the data in TEMP_TABLE_ONE (i.e., data from UDT named CHANGE_INDICATOR and TABLE_ONE) and joins such data in a UNION ALL command to generate "Resultant Table 1" 40a having the same cardinality (number of rows) as relational database table 20a. Using the same instance of the UDT, the query 30 also uses a Cartesian product to SELECT all the data in TEMP_TABLE_TWO and joins such data in another UNION ALL command to generate "Resultant Table 2" 40b having the same cardinality (number of rows) as relational database table 20b. A Cartesian product is integrated into the present query 30 by eliminating WHERE clauses within the algorithm, since a WHERE clause determines which rows should be returned in the result table. By removing any instances of a WHERE clause, all rows in one table will be joined against all rows in another table (i.e., a Cartesian product).

```
WITH
SQL_SINGLETON( SINGLETON ) AS
(
  VALUES
    CHANGE_INDICATOR( )...INIT( 'VALUE' )
),
TEMP_TABLE_ONE AS
(
  SELECT
    STATE_VAR,
    SINGLETON.GET_INDICATOR( STATE_VAR ),
  FROM
    TABLE_ONE,
    SQL_SINGLETON
),
TEMP_TABLE_TWO AS
(
  SELECT
    STATE_VAR,
    SINGLETON.GET_INDICATOR( STATE_VAR ),
  FROM
    TABLE_TWO,
    SQL_SINGLETON
)
SELECT
  *
FROM
  TEMP_TABLE_ONE
  UNION ALL
SELECT
  *
FROM
  TEMP_TABLE_TWO
  UNION ALL
```

It should be appreciated and understood that the above-described query (or algorithm) is for exemplary purposes only. Other software subroutines may be employed, obtaining similar results through different coded functions. The present invention is not limited to any one particular type of software code, nor is it relegated to any one particular suite of functions to obtain the resultant output.

Figure 3A:
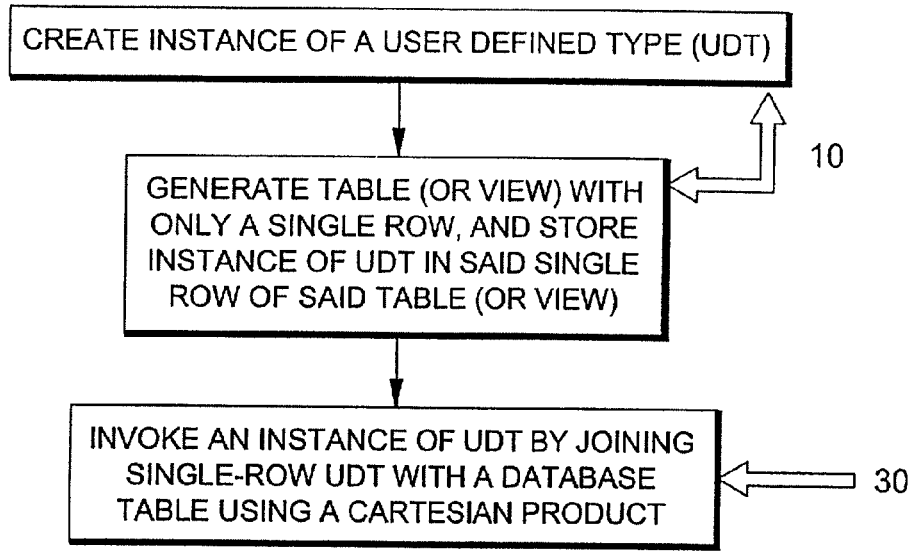
FIGS. 3A and 3B illustrate a UDT table of the invention that may be invoked in a single query or shared amongst several queries within a relational database management system, respectively.
Figure 3B:
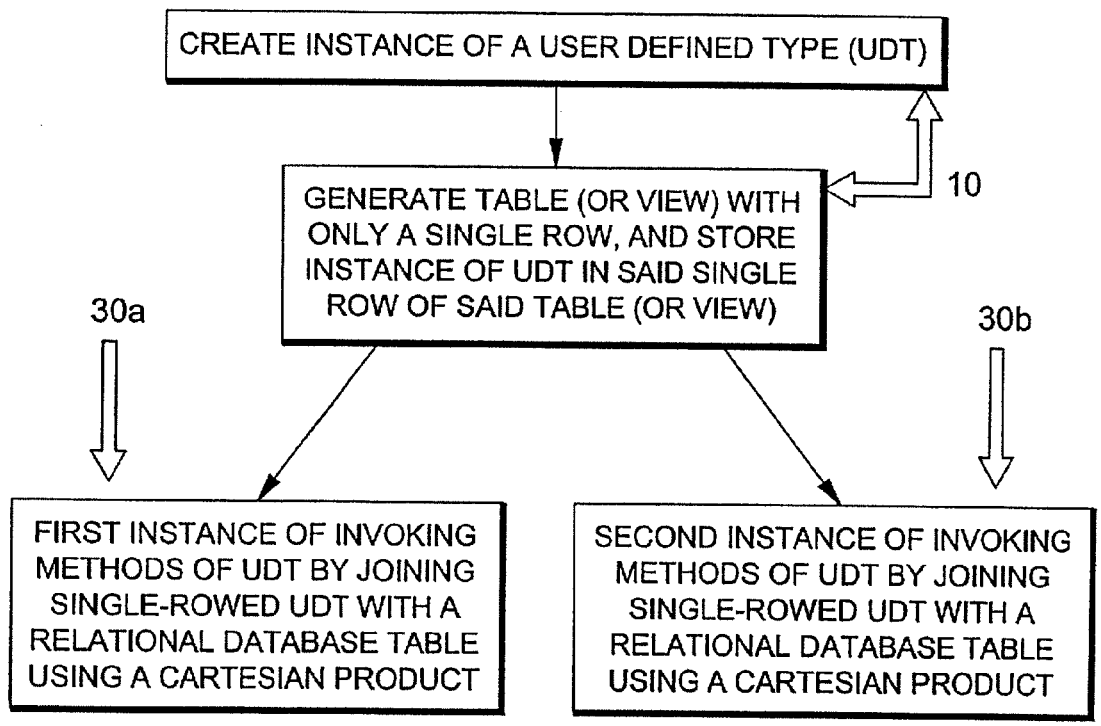
Figure 4:
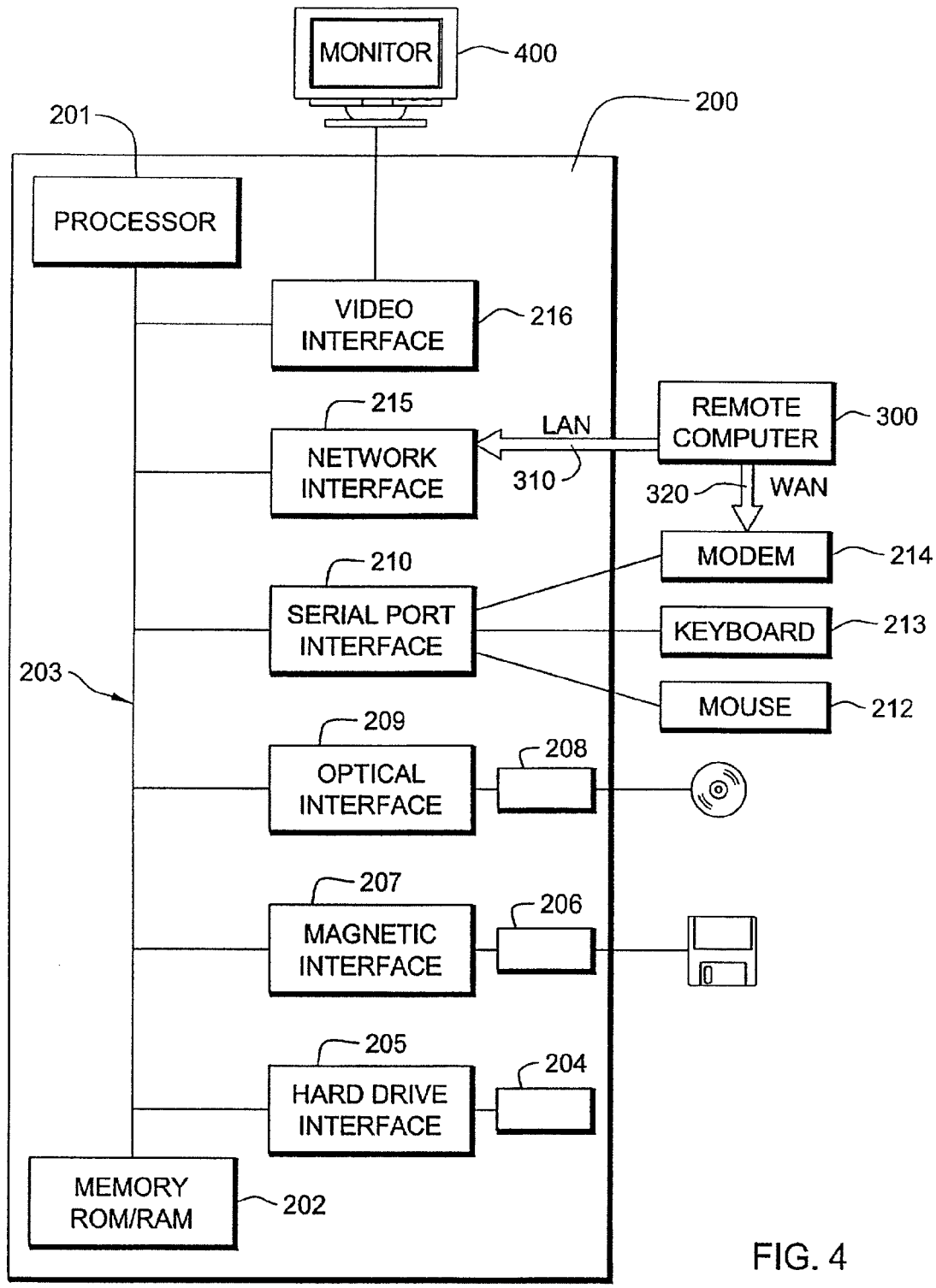
FIG. 4 is a block diagram representing an exemplary computing device in which the present invention may be implemented.

Referring to FIGS. 3A and 3B, since the present UDT table 10 need only be generated once, only a single instance of this UDT table is stored and resides on the relational database. This single instance of the UDT table can be accessed and used by a single user of the relational database, or it may be shared amongst several users of the relational database, either in a network environment or distributed computing environment. As shown in FIG. 3A, a single instance of the UDT table may be invoked by a user to join UDT table 10 with a database table using a Cartesian product. Alternatively, FIG. 3B shows that the single instance of the UDT table may be used numerous times either by a single user or by multiple users of the database. The multiple uses of the single UDT table 10 may be by a single user through either simultaneous or sequential uses, or these multiple uses may be by several users of the database at their respective locations, which may also be simultaneous or sequential uses.

Accordingly, the invention provides an easy and efficient approach to access and use data and methodology of a single instance of a UDT table having only one row of persisted objects, as well as allows sharing of this single instance of the UDT table within a database management system. The invention also enables user(s) to easily, efficiently and simultaneously get behavior from this single instance of the UDT table, without increasing cardinality of the resultant data set. The invention is particularly useful in higher order languages, such as, SQL.

While the invention has been described in the general context of a database software program that runs on an operating system in conjunction with a personal computer, those skilled in the art will recognize that all, or any portion thereof, the various systems, methods, and aspects of the invention may be embodied in hardware, software, or a combination of both. When embodied in software, any and/or all of the invention, may be embodied in the form of program code, i.e., a set of instructions, which may be stored on a computer-readable medium. The computer-readable medium includes, but is not limited to, a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention.

Those skilled in the art will also appreciate that the invention may be practiced with other computer system configurations, including hand-held devices, multiprocessor systems, microprocessor-based or programmable consumer electronics, minicomputers, mainframe computers, and the like. The invention may also be practiced in a network environment or distributed computing environment, having remote or local storage, where tasks are performed by remote processing devices that are linked through a communications network.

The invention may be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, which again becomes an apparatus for practicing the invention. When implemented on a general-purpose processor, the program code may combine with the processor to provide a unique apparatus that operates analogously to specific logic circuits For instance, referring to FIG. 4, an exemplary system for implementing the invention includes a conventional personal computer 200, including a processor 201 coupled to a system memory 202 via a system bus 203. The system memory 22 includes read only memory (ROM) with an input/output (BIOS), and random access memory (RAM with basic routines for transferring information between elements within the computer and operating the present invention, including, an operating system, a database management program, program data, and various other program module.

Also connected to the system bus 203 is a hard disk drive 204 via a hard disk drive interface 205, a magnetic disk drive 206 via a magnetic disk drive interface 207 (to read from or write to a removable disk), and an optical disk drive 208 via an optical disk drive 209 for reading a CD-ROM disk). These drives and their associated computer-readable media provide nonvolatile storage for the personal computer 200. While the foregoing has been described in relation to a hard disk, removable magnetic disk and CD-ROM disk, any other types of media that are readable by a computer, such as magnetic cassettes, flash memory cards, digital video disks, Bernoulli cartridges, and the like, may also be used in this exemplary system.

Again, a number of program modules may be stored in the hard drive interface and RAM, including an operating system, one or more application programs, other program modules, and program data. In particular, one of the program modules is a database management software program that includes certain embodiments of the invention described above. These and other input devices are often connected to the processing unit through a serial port interface 210 that is coupled to the system bus, but may be connected by other known interfaces (e.g., a game port or a universal serial bus (USB), etc.). Input devices including but not limited to a mouse 212, keyboard 213 and modem 214 may be connected to the system bus 203 via a serial port interface. A monitor 47 (or other type of display device) is also connected to the system bus 23 via a video interface, such as a video adapter 48. In addition to the monitor, personal computers typically include other peripheral output devices (not shown), such as speakers or printers. Additionally, other input devices, such as a microphone, joystick, game pad, satellite dish, scanner, or the like, may be connected to the computer, as well as other peripheral output devices, such as, speakers or printers.

The computer may operate in a networked environment using logical connections to one or more remote computers, such as a remote computer 300. This remote computer may be a server, a router, a peer device or other common network node, and typically includes many or all of the elements described relative to personal computer 200. The remote computer 300 may be connected to personal computer 200 by a local area network (LAN) 310 via a network interface 215 (which is connected by the system bus 203) or a wide area network (WAN) 52 via modem 214 (which may be internal to the computer or external (i.e., connected by the system bus 203 by the input serial port interface 210)) or other means for establishing communications over the WAN 52, such as the Internet. Both the LAN and WAN networks are commonplace in offices, enterprise-wide computer networks, intranets and the Internet. It will be appreciated that the network connections shown are exemplary and other means of establishing a communications link between the computers may be used.

It will be appreciated that the principles of the invention are not strictly limited to standalone database software programs, but could equivalently be applied to any computer-implemented system that involves the use of object-relational concepts and data storage, or any application that a query system is desired for accessing non-relational data structures. It will be further appreciated that the invention could equivalently be implemented on host or server computers other than personal computers, and could equivalently be transmitted to the host computer by means other than a CD-ROM, for example, by way of a network connection interface.

An exemplary networked or distributed computing environment includes a number of computing server objects and a number of computing devices, with the server objects in communication with the client computing devices (i.e., computers) via a network, in which the present invention may be employed. The network may be a LAN, WAN, intranet, the Internet, or some other network medium, with a number of client or remote computing devices and at least one server computer. The computing devices may include, but are not limited to, computers, various digital devices such as PDAs, televisions, MP3 players, etc., software objects such as interfaces, COM objects and the like. For instance, in a network environment in which the communications network is the Internet, the servers can be servers with which the client computing devices communicate via any of a number of known protocols, such as, HTTP. In accordance with the invention, each object may contain an application that might make use of an API, or other object, software, firmware and/or hardware, to request use of the processes used to implement the object persistence methods of the present invention. Thus, the network infrastructure enables a host of network topologies such as client/server, peer-to-peer, or hybrid architectures.

While the present invention has been particularly described, in conjunction with a specific preferred embodiment, it is understood that changes may be made to the embodiments described above without departing from the broad inventive concepts thereof. It is also understood that that the present invention may be embodied in any database management system that supports the creation and use of user defined types. Accordingly, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of implementing behavior of a user defined type in a database management system comprising:
   providing a Cartesian product;
   generating a query having said Cartesian product so that said query is optimized with said Cartesian product after said Cartesian product has been formed;
   providing a database on a computer, said database having a data table with multiple rows;
   generating within said database a user defined type (UDT) table having only a single row;
   creating an instance of a UDT having persisted objects;
   storing said instance of said UDT having said persisted objects within said single row of said UDT table; and
   implementing on said computer said query having said Cartesian product to join said single row UDT table and said data table, whereby using said query having said Cartesian product behavior of said instance of said UDT is invoked on said single row UDT table and said data table to generate a resultant data table having an equivalent cardinality as said data table, said resultant data table being generated after formation of said Cartesian product.

2. The method of claim 1 wherein said instance of said UDT comprises a type selected from the group consisting of a distinct UDT, a structured UDT and a reference UDT.

3. The method of claim 1 wherein said wherein just prior to said step of joining said single row UDT table and said data table are not modified so that said resultant data table has the same number of multiple rows as said data table with multiple rows.

4. The method of claim 1 wherein said database comprises a relational database or an object relational database.

5. The method of claim 1 wherein said UDT table further includes multiple columns defined as various UDTs each having only said single row.

6. The method of claim 1 wherein said instance of said UDT includes persisted objects, whereby at least one or more of said persisted objects are used by said query to invoke said behavior.

7. The method of claim 5 wherein said persisted objects are selected from the group consisting of data objects, methodology and combinations thereof.

8. The method of claim 1 wherein only a single instance of said UDT resides in said database.

9. The method of claim 1 further comprising:
   providing said database having multiple data tables each with multiple rows;
   implementing on said computer said query having said Cartesian product to join said UDT table and said multiple data tables; and
   invoking said behavior of said instance of said UDT on said computer to generate multiple resultant data tables without increasing cardinality of each said resultant data table, said multiple resultant data tables being generated after formation of said Cartesian product.

10. The method of claim 1 wherein a single user implements said query to invoke said behavior.

11. The method of claim 10 further comprising said single user generating at least a second query for implementation on said UDT table to invoke additional behavior of said UDT.

12. The method of claim 11 wherein said query and said second query are implemented simultaneously.

13. The method of claim 11 wherein said query and said second query are implemented sequentially.

14. The method of claim 1 further comprising multiple users of said database sharing a single instance of said UDT table.

15. The method of claim 1 wherein said multiple users share said single instance of said UDT table by implementing a number of different queries on said UDT table.

16. The method of claim 15 wherein said query and at least some of said different queries are implemented simultaneously.

17. The method of claim 15 wherein said query and at least some of said different queries are implemented sequentially.

18. The method of claim 1 further comprising performing said method in said database management system using SQL.

19. A computer program product comprising:
   a non-transitory computer usable medium having computer readable program code means embodied therein for implementing behavior of a user defined type in a database management system, said program code, when executed on a computer, causing the computer to:

provide a Cartesian product;
generate a query having said Cartesian product so that said query is optimized with said Cartesian product after said Cartesian product has been formed;
provide a database having a data table with multiple rows;
generate a user defined type (UDT) table having only a single row within said database;
create an instance of a UDT having persisted objects;
store said instance of said UDT having said persisted objects within said single row of said UDT table; and
implement said query having said Cartesian product for joining said single row UDT table and said data table, whereby using said query having said Cartesian product behavior of said instance of said UDT is invoked on said single row UDT table and said data table to generate a resultant data table having an equivalent cardinality as said data table, said resultant data table being generated after formation of said Cartesian product.

20. An article of manufacture comprising a processor and a program storage device readable by and running on the processor capable of executing instructions and tangibly embodying a program of instructions executable by the processor to perform method steps for implementing behavior of a user defined type in a database management system, said method steps comprising:
providing a Cartesian product;
generating a query having said Cartesian product so that said query is optimized with said Cartesian product after said Cartesian product has been formed;
providing a database having a data table with multiple rows;
generating within said database a user defined type (UDT) table having only a single row;
creating an instance of a UDT having persisted objects;
storing said instance of said UDT having said persisted objects within said single row of said UDT table; and
implementing said query having said Cartesian product to join said single row UDT table and said data table, whereby using said query having said Cartesian product behavior of said instance of said UDT is invoked on said single row UDT table and said data table to generate a resultant data table having an equivalent cardinality as said data table, said resultant data table being generated after formation of said Cartesian product.

* * * * *